Dec. 8, 1970 J. M. KOSTICH 3,546,049

SYMMETRICAL NON-CARTESIAN MULTIPLE-AXIS JOINING OF BEAMS

Filed May 25, 1967 4 Sheets-Sheet 1

SYMMETRICAL NON-CARTESIAN MULTIPLE-AXIS JOINING OF BEAMS

Filed May 25, 1967 4 Sheets-Sheet 2

United States Patent Office 3,546,049

Patented Dec. 8, 1970

3,546,049

SYMMETRICAL NON-CARTESIAN MULTIPLE-AXIS JOINING OF BEAMS

John M. Kostick, Roxbury, Mass., assignor to Omniversal Design, Roxbury, Mass., a partnership Filed May 25, 1967, Ser. No. 641,291
Int. Cl. A47q 33/08
U.S. Cl. 161—7 15 Claims

ABSTRACT OF THE DISCLOSURE

Joining at least four beams oriented on non-Cartesian axes with rigidity or foldability as required, each beam having elongated component elements, the axes of the beams joined preferably meeting at a common point, the elements crossing but not intersecting in a region of beam intersection, the beams being interleaved in fixed and regular patterns.

This invention relates to joining beams formed from sets of elongated space-filling elements.

It is a primary object of the invention to provide a symmetrical non-Cartesian multiple-axis joining for more than three beams. Other objects of the invention are to provide such a joining that may be readily fabricated in either rigid or foldable form from standard relatively inexpensive elements, to provide any desired degree of element spacing or density at the region of beam intersection while yet preserving the desirable structural characteristic that the vector resultant of both compression loads and tension loads applied to the beams joined pass through a single common point and thus generate no rotational moments about that common point.

The invention features at least four beams each comprising at least two elements symmetrically arrayed about the geometrical center or axis of the beam. Although the axes of all the beams joined meet at a single common point, the elements of the diverse beams do not intersect at any point of the joining but instead pass freely through the region of beam intersection without interfering with each other. The elements of any given beam are generally parallel to each other in the region of joining and are interleaved with the elements of each other beam in accordance with uniform patterns or phase rules. In rigid embodiments, tension linkages of fixed length join the elements of the diverse beams about the points of contact or closest approach as the case may be. In other embodiments relative movement may be permitted between crossing elements of the diverse beams, thus producing joinings which may fold or slide with predetermined degrees of freedom. The elements of the joined beams are commonly made of matter in the solid state, but the same organization can be applied to other space-filling elements such as beams of light or other energy.

Other objects, features, and advantages will appear from the following description of preferred embodiments of the invention taken together with the attached drawings in which.

Figure 1:
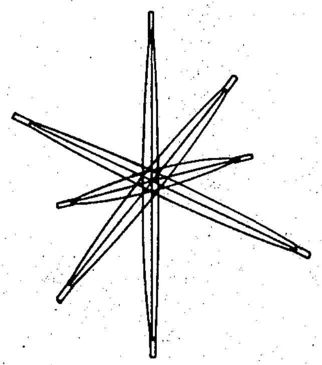
FIG. 1 is a perspective view of one form of four-axis joining having three elements in each of the four beams.
Figure 2:
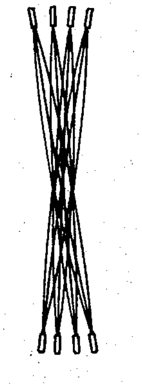
FIG. 2 is a perspective view of the same joining in a folded position.

FIG. 1 and FIG. 2 show one useful and easily fabricated embodiment of a four-axis joining of four beams each composed of three flexible elements. The three elements of each beam are bent into contact and fastened together at their end points. The elastic restoring force of the flexible elements tends to bias them together at the intersection region of the joining. This restoring force serves as a relatively weak form of tension linkage between adjacent elements of separate beams.

In the open equilibrium position shown in FIG. 1, the axes of the four beams lie along the diagonals of a cube the corners of which are defined by the end points of the beam axes (assuming beams of equal length intersecting at their midpoints). The structure is relatively stable in this position, and will bear a moderate load, but if sufficient force is applied to overcome the tension linkages the four corners of any face of the cube may be compressed together thereby collapsing the joining into the folded position shown in FIG. 2. This characteristic is particularly useful for structural joinings which must be reduced in volume for storage or shipment. The joinings may be kept folded as shown in FIG. 2 until ready for use, and then expanded into the position of FIG. 1. If greater rigidity is required than is provided by the elastic restoring force of the flexible elements then the crossing elements may be joined by stronger tension linkages (for example welds).

Figure 3:
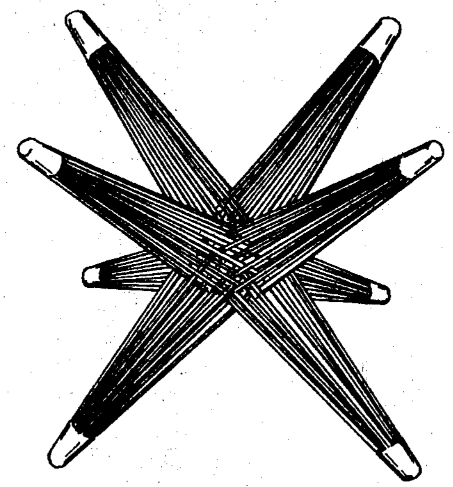
FIG. 3 is a perspective view of another four-axis joining having twelve elements in each beam.

FIG. 3 shows a related embodiment of a four-axis joining having twelve elements in each of the four beams. This embodiment also displays a relatively stable open equilibrium position in which the axes of the four beams define the diagonals of a cube, and also may be translated into a compact, folded position with the four corners of any face of the cube brought into relative proximity.

Figures 4, 17, 18:
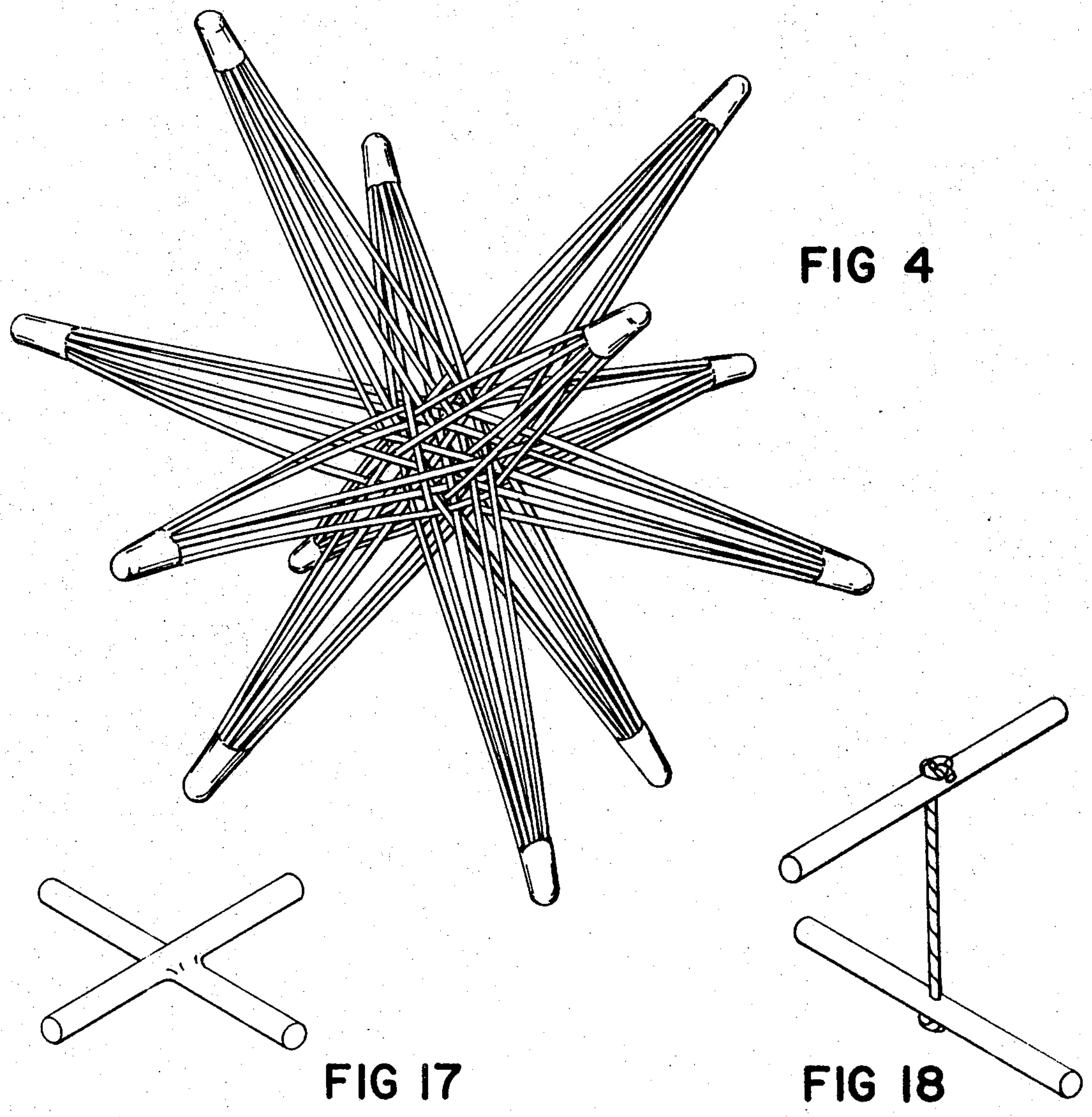
FIG. 4 is a perspective view of a six-axis joining having five elements in each beam.
FIG. 17 shows one form of tension linkage between two crossing elements of different beams wherein the elements are in contact at the point of crossing.
FIG. 18 shows another form of tension linkage between two crossing elements of different beams wherein the elements are not in contact at their point of closest approach to each other.

Like the four-axis embodiments shown in FIG. 1, FIG. 2, and FIG. 3, the embodiment shown in FIG. 4 utilizes flexible elements fastened together at the end of each beam. However, because the joining of the embodiment shown in FIG. 4 is symmetrical about six different axes rather than four, an entirely different geometry is required in the region of beam intersection. Each of the six beams comprises five elements (rather than three elements or multiples thereof). In the region of intersection, the elements of the six beams lie along the chords of a truncated icosahedron, whereas those of the four-axis joinings lie along the chords of tetraxidecahedrons (fourteen-faced solids having six square faces and eight hexangonal faces).

In the open equilibrium position the twelve end points of the beam axes define the vertices of a regular icosahedron (again assuming beams of equal length intersecting at their midpoints). Since the volume of an icosahedron is nearly equal to that of a sphere of equal surface area, it is a useful structure for enclosing a maximum volume with a minimum of surface material. The embodiment of FIG. 4 provides a foldable framework for such an enclosure; the framework may be completely enclosed with twenty panels in the shape of equilateral triangles.

Although the three embodiments described above all use flexible elements gathered together at the end of each beam, the joinings of the present invention are not limited to such flexible elements joined at beam ends. The elements may also be parallel throughout their entire length or otherwise curved outside the region of beam intersection.

Provided that the crossings of elements of separated beams are securely constrained by suitable tension linkages the joinings become rigid and non-deformable. Typical tension linkages are shown schematically in FIG. 16 and FIG. 17. For some applications releasable linkages may prove worthwhile in that they permit the joining to be foldable or rigid as required. As may be seen from FIG. 17 there is no requirement that crossing elements be in contact so long as their maximum separation is fixed. This characteristic of the joinings of the invention permits the construction of a variety of joinings having differing element density in the region of beam intersection. In some applications it may be desired to have the crossing elements tightly packed; in others, widely separated.

Figure 6:
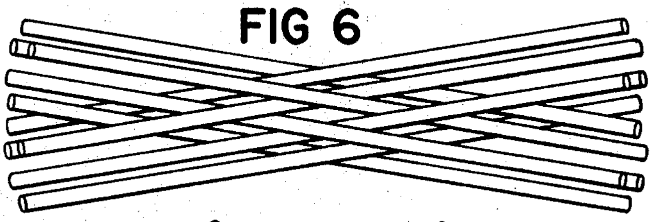
FIG. 6 is a more detailed perspective view of the intersection region of the same joining shown in the folded position of FIG. 2.
Figure 5:
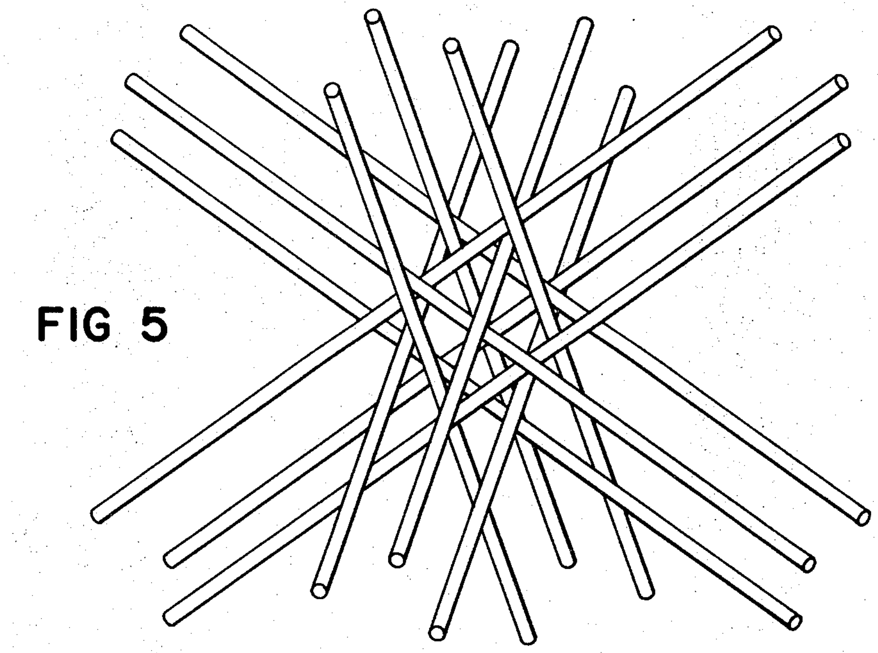
FIG. 5 is a more detailed perspective view of the central portion or intersection region of the joining shown in FIG. 1.

FIG. 5 is a detailed perspective view of the intersection region of a joining such as that used in the embodiment of FIG. 1. The joining is shown in open position with the axes of the four beams lying along the diagonals of a cube. In FIG. 6 the same intersection region is shown in the folded position of FIG. 2.

Figure 7:
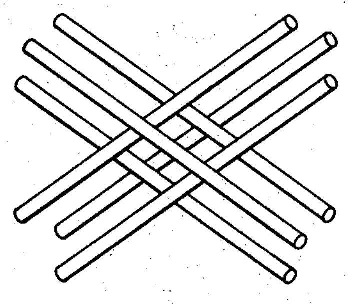
FIG. 7 is a plan view of the intersection of two of the four three-element beams of the joining shown in FIG. 1 and FIG. 6 illustrating the phase rule or pattern by which each of the beams is interleaved with each of the remaining three beams.
Figure 8:
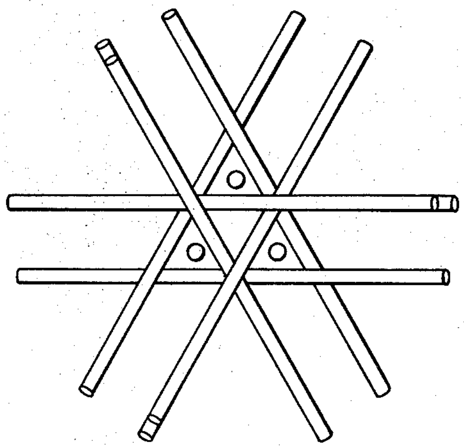
FIG. 8 is a view taken along the axis of one of the four beams of the same joining.
Figure 9:
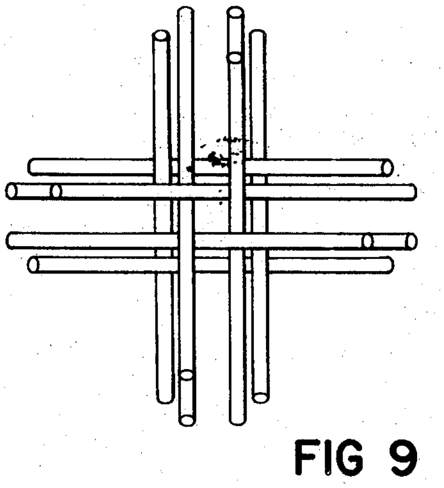
FIG. 9 is a view taken normal to one of the faces of the cube defined by the end points of the four beam axes when the joining is in the position shown in FIG. 1 and FIG. 5.

Each of the four beams in the joining bears an identical and symmetrical relationship to each of the remaining three beams in the joining. A detailed plan view of the intersection of a single pair of three-element beams is shown in FIG. 7. This pair-joining pattern or phase rule defines the entire structure of the joining with the exception of its parity; these joinings may be fabricated in either left or right-handed form. The beam intersection region comprises six such pair joinings. (In general, for all joinings of the invention wherein there are N beams there are N(N-1)/2 identical, but not necessarily symmetrical, joinings.) The entire four-axis joining of FIG. 5 is shown as viewed along the axis of one of the four beams in FIG. 8. The same joining is shown in FIG. 9 as viewed normal to one of the faces of the cube defined by the end points of the beam axes.

Figure 19:
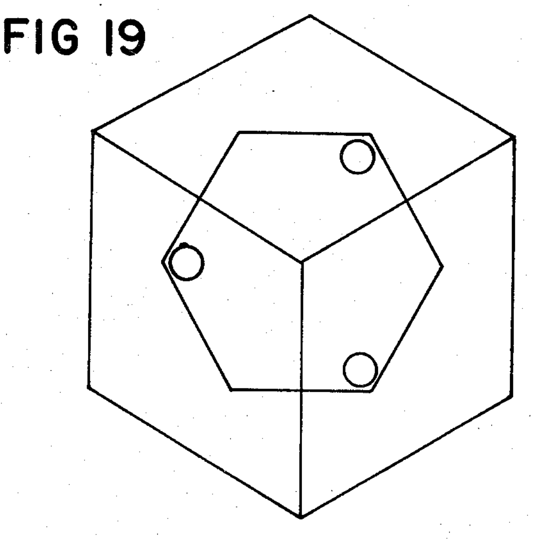
FIG. 19 is a diagrammatic view of one of four corners of a jig or fixture for constructing the joining shown in FIG. 5.

Although the structure of FIG. 5 in finished form is somewhat complex, its fabrication is simple and economical. Such joinings may be readily constructed by use of a suitable jig or fixture. Such a jig can be made by piercing four identical blocks with three parallel holes at the vertices of an equilateral triangle (to conform to the positions of the three elements shown end-on in FIG. 8). These four blocks are then centered on the diagonals of a cube with the axes of the holes parallel to the diagonals of the cube. The blocks must be rotated to an appropriate angular orientation. The holes are displaced thirty degrees from the projection of the cube edges as shown in FIG. 19. The twelve elements of the joining can then be inserted through the twelve holes of the jig thus producing the correct interleaving as shown in FIG. 5, FIG. 8, and FIG. 9. If the beam ends are to be fastened together means must be provided to open the jig blocks to release the elements.

Similar jigs or fixtures may be used to fabricate the other joinings of the invention. For example, the joining used in the embodiment of FIG. 4 is shown as viewed along the axis of one of the four beams in FIG. 10. This joining can be readily fabricated by use of a fixture containing four blocks pierced with twelve parallel holes positioned to conform to the elements shown end-on in FIG. 10. These four blocks are again centered on the diagonals of a cube with the axes of the holes parallel to the diagonals of the cube and the blocks are again rotated to orient the holes of the three central elements at a displacement of thirty degrees from the projection of the cube edges. The forty-eight elements of the joining may then be inserted and interleaved as were the twelve elements of the previous example.

Figure 10:
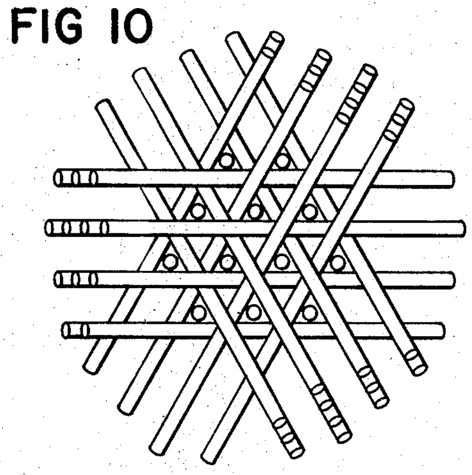
FIG. 10 is a view of joining of FIG. 3 taken down the axis of one of the four beams.

The basic tetraxi joining is the three-element embodiment shown in FIG. 5 which employs the phase rule shown in FIG. 7. The more complicated twelve-element tetraxi joining of FIG. 10 employs the same basic phase rule and is only one of a large set of tetraxi joinings. The symmetrical members of this set of tetraxi joinings comprise 3 N elements in each of the four beams with the elements so spaced as to form additional equilateral triangles sharing sides with the central triangle or with each other. Each additional three elements added to a beam produces three additional triangles, one on each of the three sides of the central triangle and each similarly located with respect to its associated side. The twelve-element tetraxi joining shown in FIG. 10 is an illustration of one embodiment of this set of symmetrical tetraxi joinings, but it should be understood that the same structural properties can be achieved with any desired number of elements that is divisible by three. The phase rule shown in FIG. 7 can, for example, be used to construct symmetrical tetraxi joinings containing six, nine, or fifteen elements in each of the four beams. The same phase rule can also be employed to construct non-symmetrical embodiments with off-center beams and indeed with beams having a different number of elements in a single joining, but for these non-symmetrical embodiments the axes of the respective beams do not in general meet at a common point.

Figures 11, 12, 13, 14, 15, 16:
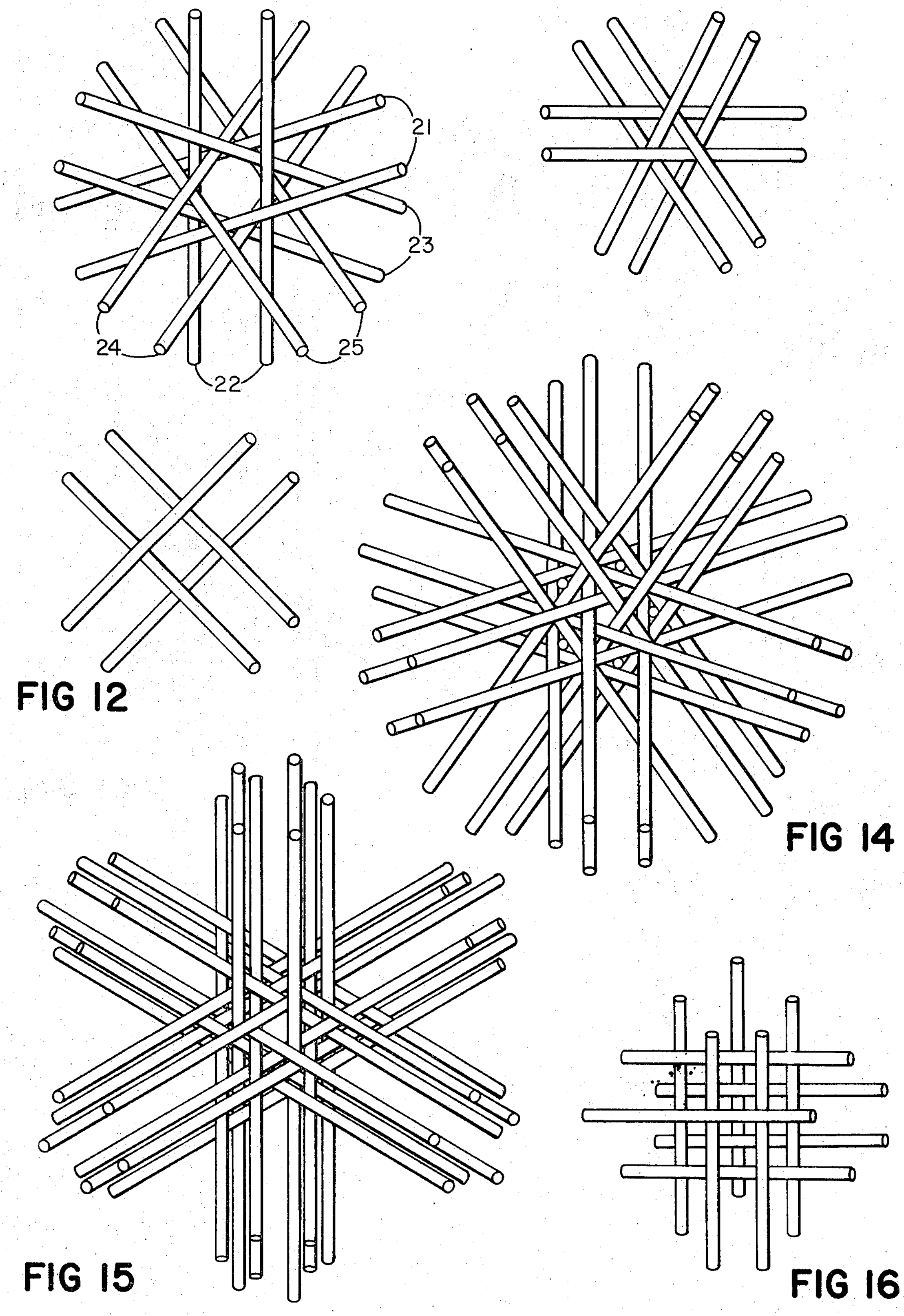
FIG. 11 is a perspective view of a Cartesian three-axis joining having two elements in each beam.
FIG. 12 is a plan view of two of the three two-element beams of the joining shown in FIG. 11 illustrating the phase rule by which each beam is interleaved with each of the remaining two beams.
FIG. 13 is a perspective view of a non-Cartesian five-axis joining employing the same phase rule.
FIG. 14 is a more detailed view of the joining of FIG. 4 taken along the axis of one of the six beams.
FIG. 15 is another detailed view of the joining of FIG. 4 taken normal to one of the sides of the icosahedron defined by the end points of the six beam axes.
FIG. 16 is a plan view of the intersection of two of the five-element beams of the same joining illustrating the applicable phase rule.

FIG. 11 shows a three-axis Cartesian joining having two elements in each beam. This joining was constructed by the artist Kenneth Snelson as an interesting theoretical illustration of Buckminster Fuller's "tensegrity" principle. None of the six elements touch each other. The end points are connected by wires which form the edges of a regular icosahedron. The phase rule of this joining is illustrated in FIG. 12. The phase rule itself is simple, though asymmetrical. (Both elements of one beam pass between the two elements of the other beam.) The complexity of the joining arises from the fact that when the first beam passes outside the second, the second outside the third, and the third outside the first, tension vectors in the form of a regular icosahedron are sufficient to maintain the system in a position of equilibrium with none of the elements touching each other and the three beams in a position of Cartesian symmetry with each beam being normal to both other beams.

The embodiment of the present invention shown in FIG. 13 uses the same phase rule, but with a different and non- Cartesian organization. The beam designated 21 passes outside beams 22 and 23, beam 22 passes outside beams 23 and 24, beam 24 passes outside beams 25 and 21 and beam 25 passes outside beams 21 and 22. The equilibrium position of this structure is a non-Cartesian five-axis system with beam 21 normal to beams 23 and 24, beam 22 normal to beams 24 and 25, beam 23 normal to beams 25 and 21, beam 24 normal to beams 21 and 22, and beam 25 normal to beams 22 and 23. Tension vectors in the form of a dodecahedron are sufficient to maintain the elements in non-contacting equilibrium. This embodiment differs from all the other embodiments claimed herein in that the pair joinings are asymmetrical.

FIG. 14 shows a detailed view of the six-axis joining of FIG. 4 taken along one of the beam axes. The same joining is shown in FIG. 15 viewed normal to one of the faces of the icosahedron defined by the end points of the six beam axes. The symmetrical phase rule used to join each of the fifteen beam pairs in this joining is shown in FIG. 16. The joining can be constructed by means of a jig with six five-hole blocks located on the diagonals of a regular icosahedron. (One hole is displaced eighteen degrees from the projection of the icosahedron edge.)

The geometries of the specific embodiments of the joinings described above are summarized in the following table which describes both the region of beam intersection and the solids defined by the end points (assuming beams extending an equal distance on either side of the common intersection point).

said elements of pairs of said beams crossing each other in different planes but not intersecting each other within said region of beam intersection, said elements in every pair of said beams being interleaved with each other in a fixed and symmetrical pattern of interleaving identical to the pattern of interleaving in every other pair of said beams.

2. The joining of claim 1 wherein said beams are symmetrically oriented along a non-Cartesian set of coordinate axes.

3. The joining of claim 1 in which the elements of the separate beams are in contact at the element crossings.

4. The joining of claim 1 in which the elements of the separate beams are held together by tension linkage means at the element crossings.

5. The joining of claim 1 in which the elements of the separate beams are held together by releasable tension linkage means at at least one of the element crossings.

6. The joining of claim 1 in which the elements of at least one of said beams converge at at least one end of said beam outside said region of intersection.

7. The joining of claim 1 in which the elements of at least one of said beams converge at at least one end of said beam outside the region of beam intersection and are held together by tension linkage means outside said region of beam intersection.

8. The joining of claim 1 comprising four beams each of said beams comprising a first element, a second element, and a third element

TABLE 1.—GEOMETRICAL SUMMARY OF PREFERRED EMBODIMENTS

| Joining | Beam-intersection region [1] | Beam end points [2] |
|---|---|---|
| Basic tetraxi joining (three-element). | Tetraxidecahedron (six square faces and eight hexagonal faces with all edges equilateral). | Body-centered cubic (diamantine cube). |
| Multiple tetraxi joining. | In general, a space-filling region composed of whole and partial adjacent tetraxidecahedrons. | Body centered cubic (diamantine cube). |
| Fix-axis joining. | Pentagonal dodecahedron (12 pentagonal faces with all edges equilateral). | "Orthopentaconic" (A system of five right angles in a conic array defining a dodecahedron having two opposite pentagonal faces, and ten isosceles triangular faces whose bases share edges with the pentagonal faces and which have vertex angles of thirty-six degrees opposite the base lines). |
| Six-axis joining. | Truncated icosahedron (having twenty triangular faces and twelve pentagonal faces with all edges equilateral). | Ocosahedron (twenty equilateral triangular faces). |

[1] Chord-structured polyhedron whose vertices are intersections of elements with sphere concentric with joining.

[2] Normal coordinate structure and polyhedron of which central axes of beams are diagonals.

The uses to which the described set of joinings may be applied are numerous. The great majority of previously known structures join beams in a Cartesian coordinate system (along three mutually normal axes). The use of other non-Cartesian coordinate systems with more than three axes provides structural modules of great variety and versatility. The advantages of strength, easy and economical fabrication, and foldability open up many new areas of construction. These structures have already found ready acceptance as designs for furniture and jewelry. Lighting fixtures and space enclosures such as fluid storage tanks are other possible uses. By making the elements tubular a variety of heat exchanger designs may be constructed.

The uses listed above by no means exhaust the possibilities. Other embodiments will occur to those skilled in the art and are within the following claims:

What is claimed is:

1. A joining comprising a set of more than three beams each of said beams comprising a plurality of elongated space-filling elements symmetrically arranged about a central axis, said beams being oriented along a non-Cartesian set of coordinate axes with the axes of said beams intersecting at a common point, any two of said beams being considered as a pair of beams, said elements of any pair of said beams crossing each other within a generally spherically bounded region of beam intersection about said common point, said elements of any given beam being generally parallel within said region of beam intersection, said first element crossing outside all elements of a first one of the remaining three beams said second element crossing outside all elements of a second one of the remaining three beams and said third element crossing outside all elements of a third one of the remaining three beams whereby each pair of said beams comprising a first beam and a second beam are symmetrically interleaved so that one element of said first beam crosses outside all elements of said second beam and one element of said second beam crosses outside all elements of said first beam.

9. The joining of claim 1 comprising four beams each of said beams comprising 3N elements where N is any positive integer three of said 3N elements being symmetrically arranged about the central axis of said beam and the remaining 3N—3 elements being symmetrically arranged about said three central elements.

10. The joining of claim 1 comprising four beams at least one of said beams comprising at least three elements.

11. The joining of claim 1 comprising six beams each of said beams comprising five elements wherein each pair of said beams comprising a first beam and a second beam are symmetrically interleaved so that one element of said first beam crosses outside of all elements of said second beam two elements of said first beam cross between two elements of said second beam and three elements of said second beam and two elements of said first beam cross between four elements of said second beam and one element of said second beam.

12. The joining of claim 1 comprising five beams,
a first beam, a second beam, a third beam, a fourth beam, and a fifth beam
each of said beams comprising two elements
the elements of said first beam crossing outside both elements of said second beam and said third beam
the elements of said second beam crossing outside both elements of said third beam and said fourth beam
the elements of said third beam crossing outside both elements of said fourth beam and said fifth beam
the elements of said fourth beam crossing outside both elements of said fifth beam and said first beam and
the elements of said fifth beam crossing outside both elements of said first beam and second beam.

13. The joining of claim 12 wherein
the axis of said first beam is normal to the axes of said third beam and said fourth beam
the axis of said second beam is normal to the axes of said fourth beam and said fifth beam
the axis of said third beam is normal to the axes of said fifth beam and said first beam
the axis of said fourth beam is normal to the axes of said first beam and said second beam and
the axis of said fifth beam is normal to the axes of said second beam and said third beam.

14. A joining comprising a set of more than three beams each of said beams comprising a plurality of elongated space-filling elements
said elements of pairs of said beams crossing each other but not intersecting
the elements of each of said beams being joined together at at least one point.

15. The joining of claim 14 in which at least one of said elements is tubular and comprises at least one generally axial passage extending through at least a portion of its length.

References Cited

UNITED STATES PATENTS

| | | | |
|---|---|---|---|
| 872,954 | 12/1907 | Martin | 52—251 |
| 998,479 | 7/1911 | Eisen | 52—251 X |
| 1,620,640 | 3/1927 | Friedrich | 240—36 |
| 3,020,660 | 2/1962 | Scherotto | 161—17 |
| 3,272,976 | 9/1966 | Charchan et al. | 161—16 X |
| 3,324,611 | 6/1967 | Gamber | 52—251 X |

FOREIGN PATENTS

| | | | |
|---|---|---|---|
| 15,971 | 10/1891 | Great Britain | 273—159 |

JOHN F. GOOLKASIAN, Primary Examiner

H. F. EPSTEIN, Assistant Examiner

U.S. Cl. X.R.

161—12, 16, 178; 52—632, 633, 664